(12) United States Patent
Li et al.

(10) Patent No.: US 11,700,025 B2
(45) Date of Patent: Jul. 11, 2023

(54) WIRELESS SINGLE-PHASE AC-TO-AC CONVERSION CIRCUIT BASED ON 2.4G MICROWAVE

(71) Applicant: UNIVERSITY OF ELECTRONIC SCIENCE AND TECHNOLOGY OF CHINA, Chengdu (CN)

(72) Inventors: Xiaoning Li, Chengdu (CN); Wei Zhou, Chengdu (CN); Zidong Zhang, Chengdu (CN); Xin Fang, Chengdu (CN); Shijun Shen, Chengdu (CN); Dawei Gong, Chengdu (CN); Dejie Li, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 8 days.

(21) Appl. No.: 17/645,318

(22) Filed: Dec. 21, 2021

(65) Prior Publication Data

US 2022/0385323 A1    Dec. 1, 2022

(30) Foreign Application Priority Data

May 31, 2021    (CN) .......................... 202110603406.9

(51) Int. Cl.
  *H04B 1/16*    (2006.01)
  *H04B 1/00*    (2006.01)
  (Continued)

(52) U.S. Cl.
  CPC .......... *H04B 1/1615* (2013.01); *H04B 1/0078* (2013.01); *H04B 1/04* (2013.01); *H04B 1/44* (2013.01); *H04B 2001/0408* (2013.01)

(58) Field of Classification Search
  CPC .. H02J 50/12; H02J 50/80; H02J 50/70; H02J 7/00034; H02J 50/10; H02J 50/90;
  (Continued)

(56) References Cited

U.S. PATENT DOCUMENTS

| | | | |
|---|---|---|---|
| 11,588,380 B2 * | 2/2023 | Lawton | ................ H02K 11/049 |
| 2010/0156511 A1 * | 6/2010 | Botula | ................ H01L 27/1203 257/350 |

(Continued)

*Primary Examiner* — Golam Sorowar
(74) *Attorney, Agent, or Firm* — Bayramoglu Law Offices LLC

(57) ABSTRACT

A wireless single-phase AC-to-AC conversion circuit based on a 2.4G microwave includes a receiving antenna unit, a RF switch unit, a positive voltage rectification unit, a negative voltage rectification unit and an AC synthesis unit. An output port of the receiving antenna unit is connected to the common input port of the RF switch unit. A first microwave output end of the RF switch unit and a second microwave output end of the RF switch unit are correspondingly connected to a microwave input end of the positive voltage rectification unit and a microwave input end of the negative voltage rectification unit, respectively. A DC output end of the positive voltage rectification unit and a DC output end of the negative voltage rectification unit are correspondingly connected to a positive voltage input port of the AC synthesis unit and a negative voltage input port of the AC synthesis unit, respectively.

6 Claims, 3 Drawing Sheets

(51) Int. Cl.
*H04B 1/04* (2006.01)
*H04B 1/44* (2006.01)

(58) Field of Classification Search
CPC ........ H02J 50/20; H02J 2207/20; H02J 50/40; H02J 7/0013; H02J 50/402; H02J 7/00712; H02J 2310/48; H02J 7/02; H02J 5/00; H02J 50/005; H02J 50/60; H02J 7/00; H02J 50/27; H02J 7/342; H02J 50/05; H02J 7/00036; H02J 7/00047; H02J 7/007182; H02J 7/04; H02J 50/001; H02J 7/0029; H03F 3/602; H03F 3/2176; H03F 3/245; H03F 2200/294; H03F 2200/451; H03F 3/211; H03F 1/0244; H03F 1/0277; H03F 1/0294; H03F 2200/516; H03F 3/217; H03F 2200/06; H03F 2200/09; H03F 3/195; H03F 2200/192; H03F 2200/204; H03F 2200/237; H03F 2200/243; H03F 2200/399; H03F 2200/537; H03F 2200/541; H03F 2203/21142; H02M 1/007; H02M 7/217; H02M 7/219; H02M 7/5387; H02M 7/06; H02M 1/0058; H02M 3/01; H02M 1/0045; H02M 1/08; H02M 3/07; H02M 3/158; H02M 7/493; H02M 7/537; H02M 1/0043; H02M 1/0009; H02M 1/0085; H02M 1/123; H02M 1/126; H02M 1/32; H02M 1/36; H02M 1/4225; H02M 3/1584

See application file for complete search history.

(56) References Cited

U.S. PATENT DOCUMENTS

| | | | |
|---|---|---|---|
| 2013/0069652 A1* | 3/2013 | Otake | G01R 33/3664 324/322 |
| 2014/0331066 A1* | 11/2014 | Chiu | H04L 12/10 713/300 |
| 2018/0159380 A1* | 6/2018 | Ii | H02M 7/06 |
| 2022/0360110 A1* | 11/2022 | Gu | H02J 7/345 |

* cited by examiner

US 11,700,025 B2

WIRELESS SINGLE-PHASE AC-TO-AC CONVERSION CIRCUIT BASED ON 2.4G MICROWAVE

CROSS REFERENCE TO THE RELATED APPLICATIONS

This application is based upon and claims priority to Chinese Patent Application No. 202110603406.9, filed on May 31, 2021, the entire contents of which are incorporated herein by reference.

TECHNICAL FIELD

The present invention relates to the technical field of microwave wireless transmission, in particular to a wireless single-phase AC-to-AC conversion circuit based on a 2.4G microwave.

BACKGROUND

Currently, electric equipment includes the direct current (DC) power equipment and the alternating current (AC) power equipment. Additionally, the existing long-distance high-voltage power transmission is mainly based on the AC transmission, so the electrical appliances in daily life are also based on an AC power supply. Moreover, cables are indispensable for a majority of the present power transmission methods, and the power transmission with cables is stable. However, the construction of high-voltage power lines is extremely expensive in extreme environments, and there are many uncontrollable factors in the extreme environments. Therefore, wireless transmission arises for the situation. Microwave transmission is typically divided into the resonant type and the microwave type, where the former is used in short-distance transmission, while the latter can achieve long-distance transmission. However, in the field of microwave wireless transmission, a conversion circuit converting the radio frequency (RF) microwave to the low-frequency AC has not been proposed, so the present invention provides a conversion circuit converting the RF microwave to the low-frequency AC for the microwave wireless transmission system.

Generally, after the DC electric energy is generated in the microwave wireless transmission system, the RF microwave is converted to AC electric energy through the inverter circuit added after the output DC, but the conversion process is involved in RF-DC-AC, and thus, this process is complicated and requires more components.

For the microwave wireless transmission system, the energy received is constant provided that the transmission power is constant and the relative distance and relative position are unchanged. The addition of the inverter circuit will greatly lower the transmission efficiency.

SUMMARY

The purpose of the present invention is to provide a wireless single-phase AC-to-AC conversion circuit based on a 2.4G microwave, which solves the problem of the low-frequency alternating current (AC) electric energy output by the microwave wireless power transmission.

The technical solution of the present invention is the wireless single-phase AC-to-AC conversion circuit based on the 2.4G microwave, including a receiving antenna unit, a radio frequency (RF) switch unit, a positive voltage rectification unit, a negative voltage rectification unit and an AC synthesis unit.

An output port of the receiving antenna unit is connected to a common input port of the RF switch unit. A first microwave output end of the RF switch unit and a second microwave output end of the RF switch unit are correspondingly connected to a microwave input end of the positive voltage rectification unit and a microwave input end of the negative voltage rectification unit, respectively. A direct current (DC) output end of the positive voltage rectification unit and a DC output end of the negative voltage rectification unit are correspondingly connected to a positive voltage input port of the AC synthesis unit and a negative voltage input port of the AC synthesis unit, respectively. An AC output port of the AC synthesis unit is connected to an AC load.

The receiving antenna unit is used for receiving microwave energy of a 2.4G microwave wireless transmission transmitter and transmitting the microwave energy to the RF switch unit.

The RF switch unit is used for transmitting the microwave energy to the positive voltage rectification unit or the negative voltage rectification unit through a control signal.

The positive voltage rectification unit and the negative voltage rectification unit are used for rectifying the microwave energy into a positive DC and a negative DC;

The AC synthesis unit is used for combining the positive DC output by the positive voltage rectifying unit and the negative DC output by the negative voltage rectifying unit to generate square-wave AC, and supplying power for the AC load.

Further, the receiving antenna unit adopts a circularly polarized microstrip antenna.

Further, the RF switch unit includes a solid-state RF switch chip U1 of type HMC8308, capacitors C1-C3 and grounded capacitors C4-C7.

A first pin of the chip U1 is connected to the grounded capacitor C4, the grounded capacitor C7, and a reference potential point $V_{DD}$, respectively. A second pin of the chip U1 is connected to the grounded capacitor C5 and the control signal end $V_{CTL}$, respectively. A third pin of the chip U1 is connected to one end of the capacitor C1, and the other end of the capacitor C1 is connected to the microwave wireless transmission transmitter. A fifth pin of the chip U1 is connected to the grounded capacitor C6 and an enable end EN of a control signal, respectively. A ninth pin of the chip U1 is connected to one end of the capacitor C2. The other end of the capacitor C2 is used as a first microwave output port RF1 of the RF switch unit. A tenth pin and an eleventh pin of the chip U1 are grounded. A twelfth pin of the chip U1 is connected to one end of the capacitor C3, and the other end of the capacitor C3 is used as the second microwave output port RF2 of the RF switch unit.

Further, the positive voltage rectification unit includes resistors R1-R2, a grounded resistor R3, a rectifier diode D1 and a grounded capacitor C8.

One end of the resistor R1 is connected to the first microwave output port RF1 of the RF switch unit, and the other end of the resistor R1 is connected to one end of the resistor R2 and the grounded resistor R3, respectively. The other end of the resistor R2 is connected to a positive electrode of the rectifier diode D1. Aa negative electrode of the rectifier diode D1 is connected to the grounded capacitor C8, and a connection point where the negative electrode of the rectifier diode D1 is connected to the grounded capacitor C8 is used as a DC output end of the positive voltage rectification unit.

Further, the negative voltage rectification unit includes resistors R4-R5, a grounded resistor R6, a rectifier diode D2, and a grounded capacitor C9.

One end of the resistor R4 is connected to the second microwave output port RF2 of the RF switch unit, and the other end of the resistor R4 is connected to one end of the resistor R5 and the grounded resistor R6 respectively. The other end of the resistor R5 is connected to a negative electrode of the rectifier diode D2. A positive electrode of the rectifier diode D2 is connected to the grounded capacitor C9, and a connection point where the positive electrode of the rectifier diode D2 is connected to the grounded capacitor C9 is used as the DC output end of the negative voltage rectification unit.

Further, the AC synthesis unit includes metal-oxide-semiconductor (MOS) transistors Q1-Q2, a port J1 of type XH2.54 3P and a port J2 of type XH2.54 2P.

A first pin of the port J1 is connected to a source electrode of the MOS transistor Q1 and the DC output end of the positive voltage rectification unit, respectively. A third pin of the port J1 is connected to a source electrode of the MOS transistor Q2 and the DC output end of the negative voltage rectification unit, respectively. A first pin of the port J2 is connected to a drain electrode of the MOS transistor Q1 and a drain electrode of the MOS transistor Q2, respectively, and the connection point where the first pin of the port J2 is connected to the drain electrode of the MOS transistor Q1 and the drain electrode of the MOS transistor Q2 is used as the AC output port of the AC synthesis unit. A second pin of the port J1, a gate electrode of the MOS transistor Q1, a gate electrode of the MOS transistor Q2, and a second pin of the port J2 are all grounded.

The advantages of the present invention are as follows.

(1) The present invention can meet the requirement of collecting microwave energy and converting it into AC electric energy. Moreover, the present invention simplifies the circuit structure of the conventional solution, and improves the stability and reliability of the circuit without reducing the overall circuit efficiency.

(2) The circuit of the present invention is designed modularly, and different module units can be replaced according to different power densities, so as to obtain the best performance and satisfy the different needs.

(3) Compared with the traditional method adding the inverter, the circuit structure of the present invention is simpler, and can make the maximum use of the microwave energy collected by the antenna, and the frequency of the output AC can adjust the AC from several Hz to tens of KHz.

DETAILED DESCRIPTION OF THE EMBODIMENTS

The embodiments of the present invention are further illustrated below in accordance with the drawings.

Figure 1:
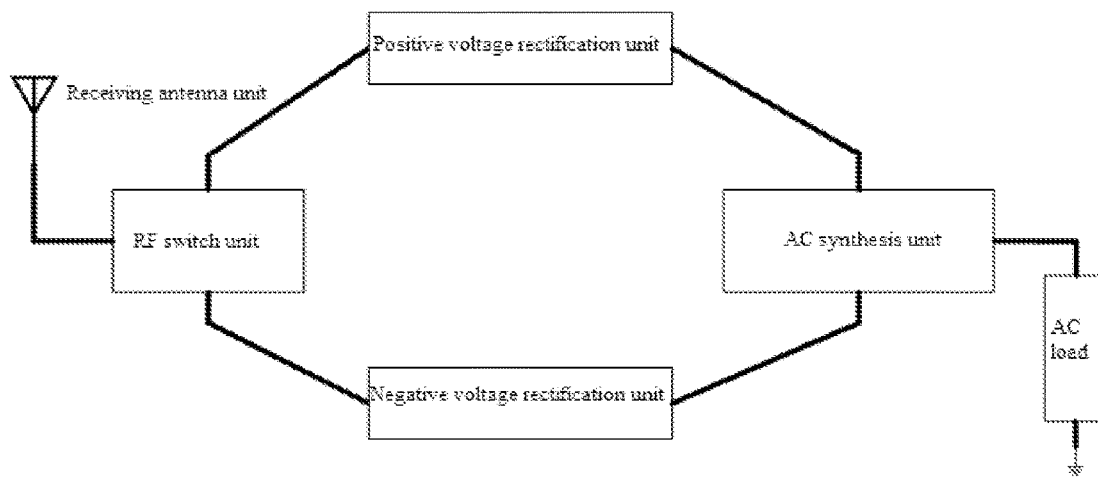
FIG. 1 is the structural diagram of the wireless single-phase AC-to-AC conversion circuit based on the 2.4G microwave.

As shown in FIG. 1, the present invention provides the wireless single-phase AC-to-AC conversion circuit based on the 2.4G microwave including the receiving antenna unit, the radio frequency (RF) switch unit, the positive voltage rectification unit, the negative voltage rectification unit, and the alternating current (AC) synthesis unit.

The output port of the receiving antenna unit is connected to the common input port of the RF switch unit. The first microwave output end of the RF switch unit and the second microwave output end of the RF switch unit are correspondingly connected to the microwave input end of the positive voltage rectification unit and the microwave input end of the negative voltage rectification unit, respectively. The direct current (DC) output end of the positive voltage rectification unit and the DC output end of the negative voltage rectification unit are correspondingly connected to the positive voltage input port of the AC synthesis unit and the negative voltage input port of the AC synthesis unit, respectively. The AC output port of the AC synthesis unit is connected to the AC load.

The receiving antenna unit is used for receiving microwave energy of a 2.4G microwave wireless transmission transmitter and transmitting the microwave energy to the RF switch unit.

Theoretically, the antenna of the receiving antenna unit is optionally selected, but considering that the antenna is typically used in the microwave wireless transmission system in practice, the antenna matching with the transmitting antenna of the system is optimal. The output port of the receiving antenna unit is connected to the microwave input common port of the RF switch unit, which is used as the microwave source of the whole conversion circuit.

The RF switch unit is used for transmitting microwave energy to the positive voltage rectification unit or the negative voltage rectification unit through a control signal.

Through the control signal, the RF switch unit controls whether the microwave energy flows into the positive voltage rectification unit or the negative voltage rectification unit, but in order to obtain positive and negative half-periodic symmetrical AC energy, the time for microwave energy to flow into the positive voltage rectification unit and the time for microwave energy to flow into the negative voltage rectification unit are both approximately equal to a half of the AC cycle.

The positive voltage rectification unit and the negative voltage rectification unit are used for rectifying the microwave energy into positive DC and negative DC.

The AC synthesis unit is used for combining the positive DC output by the positive voltage rectifying unit and the negative DC output by the negative voltage rectifying unit to generate square-wave AC, and supplying power for the AC load.

The positive direct current output from the positive voltage rectification unit and the negative direct current output from the negative voltage rectification unit are input to the AC synthesis unit, and then are combined to synthesize the positive and negative symmetrical square-wave AC that supplies power for the AC load. Finally, the frequency of the AC output by the AC synthesis unit can be controlled by the micro-power control signal frequency of the RF switch unit.

In the embodiment of the present invention, the receiving antenna unit adopts a circularly polarized microstrip antenna.

Figure 2:
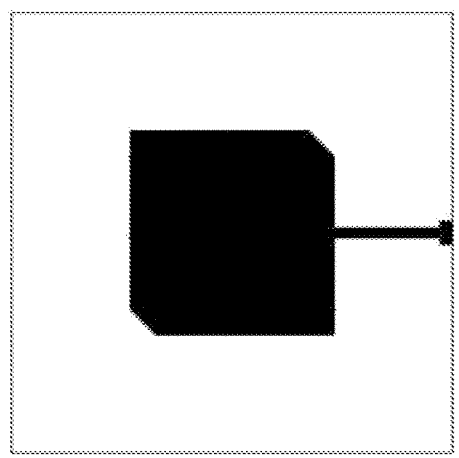
FIG. 2 is the top view of the receiving antenna unit.

FIG. 2 is the top view of the receiving antenna unit in the embodiment of the present invention, and the design process of the receiving antenna unit is as follows.

Specifically, the receiving antenna unit adopts a circularly polarized microstrip antenna manufactured by the 1OZ copper-thick FR4 printed board with 1.6 mm thickness. The design method of the circularly polarized microstrip antenna is as follows.

The dielectric parameters $\varepsilon_r$ and the material thickness h of the microstrip antenna can be determined after the selection of the dielectric substrate, and the central frequency point f of the designed antenna in working is also known.

After the parameters of the previous step are known, the width w of the microstrip patch can be calculated by using the following formula.

The calculation formula is as follows:

$$w = \frac{c}{2f}\left(\frac{\varepsilon_r + 1}{2}\right)^{-\frac{1}{2}}$$

wherein, c is the speed of light.

According to the empirical value, the length of the microstrip patch usually is ½ of the guide wavelength ($\lambda_e$), where the guide wavelength is:

$$\lambda_e = \frac{c}{f\sqrt{\varepsilon_e}}$$

wherein $\varepsilon_e$ is the effective dielectric constant, which calculated by the following formula:

$$\varepsilon_e = \frac{\varepsilon_r + 1}{2} + \frac{\varepsilon_r - 1}{2}\left(1 + 12\frac{h}{w}\right)^{-\frac{1}{2}}$$

Considering the edge shortening effect, the actual microstrip patch length L is calculated as follows:

$$L = \frac{c}{f\sqrt{\varepsilon_e}} - 2\Delta L$$

wherein, $\Delta L$ represents the equivalent radiating slot length and is calculated as follows:

$$\Delta L = 0.412h\frac{(\varepsilon_e + 0.3)(w/h + 0.264)}{(\varepsilon_e - 0.258)(w/h + 0.8)}$$

The circular polarization condition of circularly polarized microstrip rectangular antennas are as follows:

$$|\Delta s/s|Q = \frac{1}{2}$$

wherein, $\Delta s$ is the area of the degenerate mode separation unit, s is the area of microstrip patch, Q is the quality factor of the microstrip patch antenna, and the calculation formula of Q is:

$$Q \approx \frac{3\lambda_0}{8h}\varepsilon_r$$

Finally, combined with the optimization of the EDA tool, the antenna is the corner-cut square patch having an edge length of 28.564 mm, a cut corner size of 3.575 mm, and a microstrip feed line length of 1.299 mm.

Figure 3:
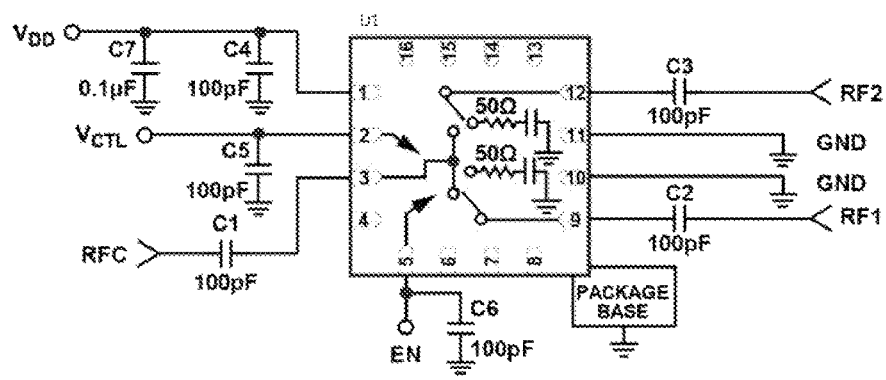
FIG. 3 is the circuit diagram of the radio frequency (RF) switch unit.

In the embodiment of the present invention, as shown in FIG. 3, the RF switch unit includes the solid-state RF switch chip U1 of type HMC8308, the capacitors C1-C3 and the grounded capacitors C4-C7.

The first pin of the chip U1 is connected to the grounded capacitor C4, the grounded capacitor C7, and the reference potential point $V_{DD}$, respectively. The second pin of the chip U1 is connected to the grounded capacitor C5 and the control signal end $V_{CTL}$, respectively. The third pin of the chip U1 is connected to one end of the capacitor C1, and the other end of the capacitor C1 is connected to the microwave wireless transmission transmitter. The fifth pin of the chip U1 is connected to the grounded capacitor C6 and the enable end EN of the control signal, respectively. The ninth pin of the chip U1 is connected to one end of the capacitor C2, and the other end of the capacitor C2 is used as the first microwave output port RF1 of the RF switch unit. The tenth pin and the eleventh pin of the chip U1 are grounded. The twelfth pin of the chip U1 is connected to one end of the capacitor C3, and the other end of the capacitor C3 is used as the second microwave output port RF2 of the RF switch unit.

The RF switch unit is the single-pole double-throw RF switch, including three RF microwave ports, i.e., one common input port and two output ports (the output port 1 and the output port 2). The RF switch unit also includes the bias power supply port and the control port. The control port can control whether the common input port of the RF switch unit is routed to the output port 1 or to the output port 2 by the high and low levels, thus to decide whether the microwave energy of the common input port is output from the output port 1 or from the output port 2. The output port 1 is connected to the positive voltage rectification unit, and the output port 2 is connected to the negative voltage rectification unit.

The RF switch unit circuit includes the solid-state RF switch chip, the RF DC-isolated capacitor and the power supply decoupling capacitor. Specifically, C1, C2, and C3 are RF DC-isolated capacitors, the ends of C1, C2, and C3 are connected to the pins 3, 9 and 12 of the RF switch chip, and the other ends of C1, C2, and C3 are connected to the common microwave input port, the microwave output port 1, and the microwave output port 2 respectively. In order to affect the operation of the RF switch chip, DC is insolated to prevent DC components from being coupled to the pins of the solid-state RF switch pins. C4 and C7 are the power supply decoupling capacitors of the RF switch chip, the ends of C4 and C7 are connected to the reference point, the other ends are connected to the power supply pin 1 of the RF switch chip. C5 is the control signal anti jitter capacitor configured for reducing the voltage overshoot of the external input control signal. Specifically, the characteristic impedance of RFC, RF1 and RF2 is 50Ω in the working frequency band (taking 2.45 GHz as an example). $V_{CTL}$ controls the common input port to be routed to one of the two output ports through the input of the high and low levels.

The RF switch unit is built with a micro-power single-pole double-throw solid-state RF switch chip to reduce additional power loss. The DC-isolated capacitors must be added at the input and output ports to avoid the influence of DC coupling on the operation of the switch chip and to avoid interfering with the working state of the RF switch unit. The input and output microstrip lines are designed with 50Ω microstrip lines. In addition, the DC unit bias is added to lead out the control port.

Figure 4:
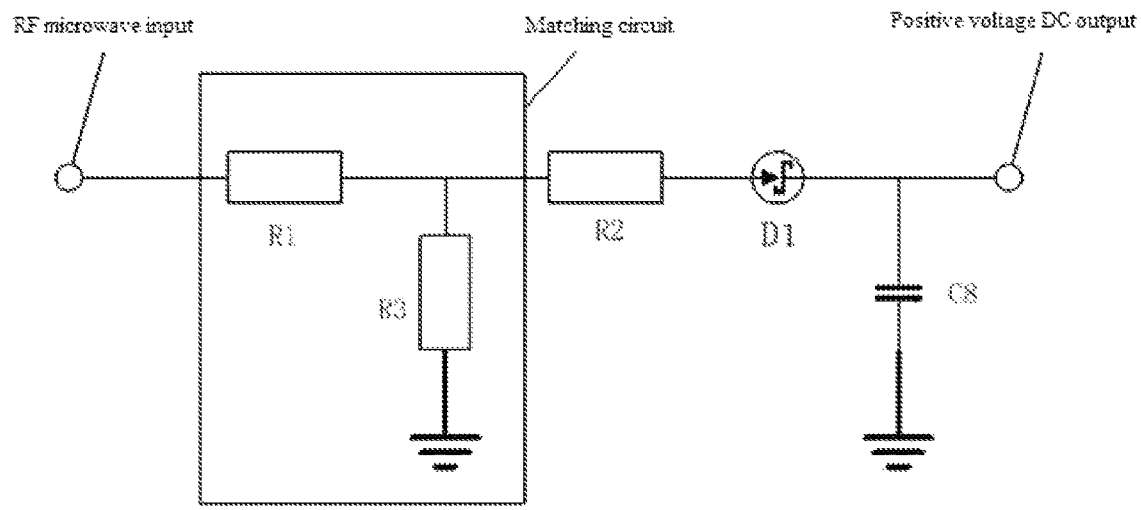
FIG. 4 is the circuit diagram of the positive voltage rectification unit.

In the embodiment of the present invention, as shown in FIG. 4, the positive voltage rectification unit includes the resistors R1-R2, the grounded resistor R3, the rectifier diode D1, and the grounded capacitor C8;

One end of the resistor R1 is connected to the first microwave output port RF1 of the RF switch unit and the other end of the resistor R1 is connected to one end of the resistor R2 and the grounded resistor R3 respectively. The other end of the resistor R2 is connected to the positive electrode of the rectifier diode D1. The negative electrode of the rectifier diode D1 is connected to the grounded capacitor C8, and the connection point where the negative electrode of the rectifier diode D1 is connected to the grounded capacitor C8 is used as the DC output end of the positive voltage rectification unit.

The positive voltage rectification unit has two ports: the microwave input port and the DC output port. The microwave input port is connected to the microwave output port 1 in the RF switch unit, and the DC output port is connected to the AC synthesis unit. Additionally, the positive voltage rectification unit includes the impedance matching, the rectification structure and the direct-through filter. The impedance matching adjusts the input impedance of the entire positive voltage rectification unit to match the same impedance as the output impedance of the output port 1 of the RF switch unit; the rectification structure includes the RF diode. The rectification structure converts the microwave into the fluctuating DC superimposed with the high-frequency component through the unidirectional conductivity of the RF diode. The direct-through filter filters out the high-frequency component output by the rectification structure, making the output DC smoother and more stable.

The RF microwave power signal passes through the matching circuit, then is rectified by the unidirectional conductivity of the rectifier diode, so that the pulsating positive DC is output. Then, the pulsating positive DC is smoothened through the direct-through filter to get the stable DC positive voltage. The RF input port needs to be connected to the port RF1 in FIG. 3. Since the impedance of the rectifier diode is not 50Ω, the input impedance of the input port needs to be matched to the impedance of 50Ω through the matching circuit. The short circuit stub matching is adopted in this embodiment. The rectification circuit has a single-diode series-connection rectification structure, wherein the negative electrode of the rectifier diode is connected to the matching circuit behind the input port, and the positive electrode of the rectifier diode is connected to the output load.

Figure 5:
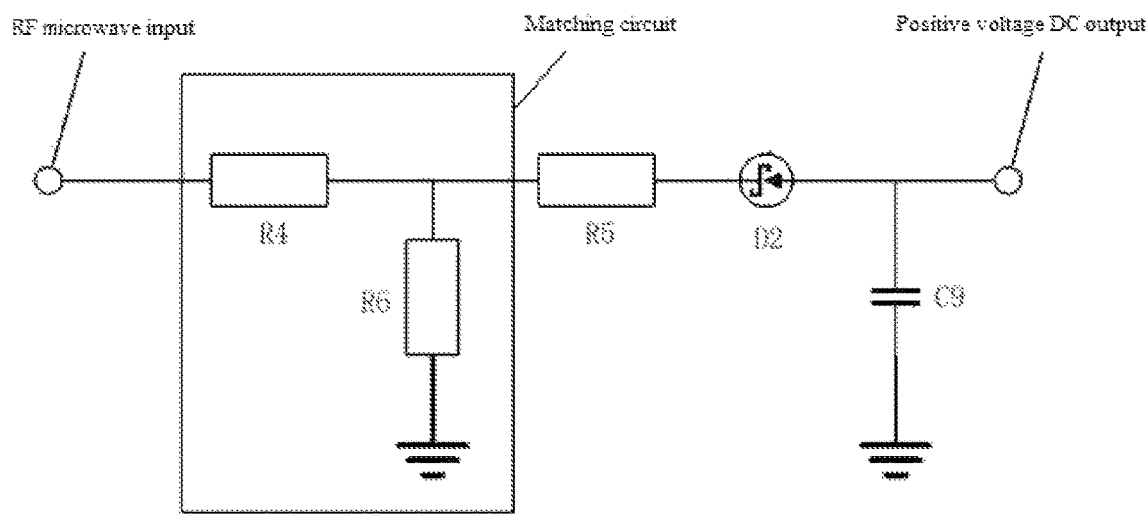
FIG. 5 is the circuit diagram of the negative voltage rectification unit.

In the embodiment of the present invention, as shown in FIG. 5, the negative voltage rectification unit includes resistors R4-R5, the grounded resistor R6, the rectifier diode D2, and the grounded capacitor C9;

One end of the resistor R4 is connected to the second microwave output port RF2 of the RF switch unit, and the other end of the resistor R4 is connected to one end of the resistor R5 and the grounded resistor R6 respectively. The other end of the resistor R5 is connected to the negative electrode of the rectifier diode D2. The positive electrode of the rectifier diode D2 is connected to the grounded capacitor C9, and the connection point where the positive electrode of the rectifier diode D2 is connected to the grounded capacitor C9 is used as the DC output end of the negative voltage rectification unit.

The negative voltage rectification unit has two ports: the microwave input port and the DC output port. The microwave input port is connected to the microwave output port 1 in the RF switch unit, and the DC output port is connected to the AC synthesis unit. Additionally, the negative voltage rectification unit includes the impedance matching, the rectification structure and the direct-through filter. The impedance matching adjusts the input impedance of the entire negative voltage rectification unit to match the same impedance as the output impedance of the output port 2 of the RF switch unit. The rectification structure includes the RF diode, and the rectification structure converts the microwave into the fluctuating DC superimposed with the high-frequency component through the unidirectional conductivity of the RF diode. The direct-through filter filters out the high-frequency component output by the rectification structure, making the output DC smoother and more stable.

The RF microwave power signal passes through the matching circuit, then is rectified by the unidirectional conductivity of the rectifier diode, so that the pulsating negative DC is output. The pulsating negative DC is smoothened through the output direct-through filter to get the stable DC negative voltage. The RF input port needs to be connected to the port RF1 in FIG. 3. Since the impedance of the rectifier diode is not 50Ω, the input impedance of the input port needs to be matched to the impedance of 50Ω through the matching circuit. The short circuit stub matching is adopted in this embodiment to ensure the good matching with the RF switch unit. The rectification circuit has a single-diode series-connection rectification structure, wherein the positive electrode of the rectifier diode is connected to the matching circuit behind the input port, and the negative electrode of the rectifier diode is connected to the output load. The circuit structure of the rectification circuit is consistent with the circuit structure shown in FIG. 4, but the direction of the rectifier diode is in the opposite direction, so as to output the negative voltage having the same amplitude as that of the positive voltage output by the positive voltage rectification circuit in FIG. 4.

The diode contained in the rectification structure of the positive voltage rectification unit and the diode contained in the rectification structure of the negative voltage rectification unit should be in the opposite direction, thus generating two DC voltages that are positive and negative opposite to each other.

Figure 6:
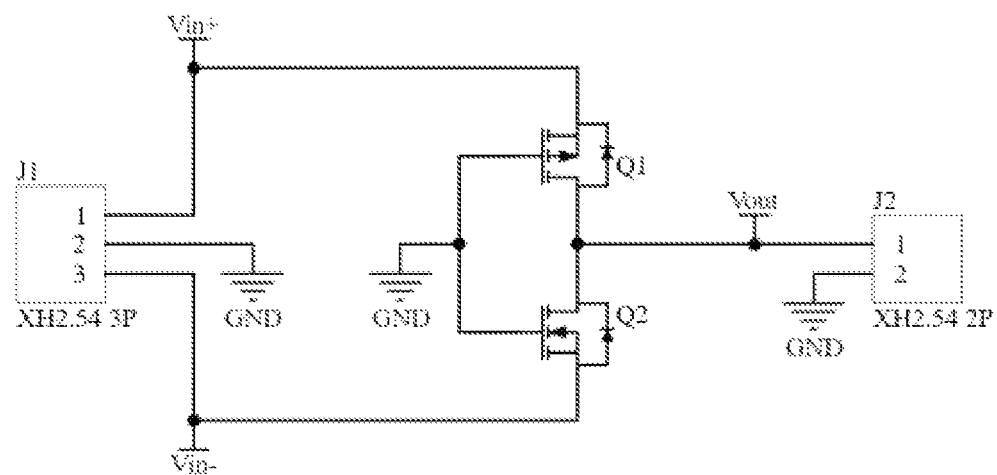
FIG. 6 is the circuit diagram of the AC synthesis unit.

In the embodiment of the present invention, as shown in FIG. 6, the AC synthesis unit includes the MOS transistors Q1-Q2, the port J1 of type XH2.54 3P and the port J2 of type XH 2.54 2P.

The first pin of the port J1 is connected to the source electrode of the MOS transistor Q1 and the DC output end of the positive voltage rectification unit, respectively. The third pin of the port J1 is connected to the source electrode of the MOS transistor Q2 and the DC output end of the negative voltage rectification unit, respectively. The first pin of the port J2 is connected to the drain electrode of the MOS transistor Q1 and the drain electrode of the MOS transistor Q2, respectively, and the connection point where the first pin of the port J2 is connected to the drain electrode of the MOS transistor Q1 and the drain electrode of the MOS transistor Q2 is used as the AC output port of the AC synthesis unit. The second pin of the port J1, the gate electrode of the MOS transistor Q1, the gate electrode of the MOS transistor Q2, and the second pin of the port J2 are all grounded.

The AC synthesis unit has three ports: the positive voltage input port, the negative voltage input port, and an AC output port. The positive voltage input port is connected to the DC output port of the positive voltage rectification unit to produce the positive half-cycle voltage of the synthetic alternating current, and the negative voltage input port is connected to the DC output port of the negative voltage rectification unit to produce the negative half-cycle voltage of the alternating current. The AC output port outputs AC power energy to supply AC power for AC power equipment. The AC synthesis unit has the function of preventing the input port from forming a closed loop to avoid the merging of two DCs input into one AC output.

The AC synthesis circuit consists of the pair of MOS transistor. Q1 is the P-channel MOS transistor, wherein the source electrode of the P-channel MOS transistor is connected to the output end of the positive voltage rectification unit, and the drain electrode of the P-channel MOS transistor is connected to the AC output. Q2 is the N-channel MOS transistor, wherein the source electrode of the N-channel MOS transistor is connected to the output end of the negative voltage rectification circuit, and the drain electrode of the N-channel MOS transistor is connected to the AC output. The gate electrodes of the two MOS transistors are grounded. At this moment, due to the existence of the RF switch unit in FIG. 2, i.e., the single-pole double-throw switch, the positive voltage rectification unit in FIG. 4 and the negative voltage rectification unit in FIG. 5 will work alternately. When the positive voltage unit works, the positive voltage unit outputs a positive voltage. At this time, the source electrode of the PMOS transistor Q1 is positive, and the gate electrode of the PMOS transistor Q1 has zero potential, so PMOS transistor is conductive to output the positive half cycle of the AC voltage. When the negative voltage unit works, the negative voltage is output. At this time, the source electrode of the NMOS transistor Q2 is negative, and the gate electrode of the NMOS transistor Q2 has zero potential, so NMOS transistor is conductive to output the negative half cycle of the AC voltage. The two half cycles work alternately, and finally the AC voltage is synthesized and output. Optimally, the NMOS transistor and the PMOS transistor requiring lower break-over voltage is employed to improve the utilization rate of the positive and negative voltages as much as possible.

The AC synthesis unit contains two complementary MOS transistor circuits, the gate electrodes of the two MOS transistors are grounded together, and the self-driving circuit is adopted.

The working principle and process of the present invention are as follows: the microwave energy collected by the receiving antenna unit is selectively transmitted to the positive voltage rectification unit or the negative voltage rectification unit through the RF switch unit, and then the positive voltage rectification unit or the negative voltage rectification unit periodically generate the positive voltage or the negative voltage, and finally output the positive voltage or the negative voltage are output to the AC synthesis unit. The AC synthesis unit merges the periodic alternating positive and negative voltages into the periodic AC voltage.

The advantages of the present invention are as follows:

(1) The present invention can complete the requirement of collecting microwave energy and converting it into AC electric energy, simplify the circuit structure of the conventional solution, and improve the stability and reliability of the circuit without reducing the overall circuit efficiency.

(2) The circuit of the present invention designed modularly, and different module units can be replaced according to different power densities, so as to obtain the best performance and satisfy the different requirements.

(3) Compared with the traditional method adding the inverter link, the circuit structure of the present invention is simpler, and can make the maximum use of the microwave energy collected by the structure antenna, and the frequency of the output AC can adjust the AC from several Hz to tens of KHz.

The ordinary technicians in the art will realize that the embodiments described herein are intended to help readers understand the principles of the present invention and the scope of protection of the present invention is not limited to such special statements and embodiments. The ordinary technicians in the art can make various other specific modifications and combinations within the essence of the present invention according to the technical inspiration disclosed by the present invention, and these modifications and combinations are still within the protection scope of the present invention.

The invention claimed is:

1. A wireless single-phase AC-to-AC conversion circuit based on a 2.4G microwave, comprising a receiving antenna unit, a radio frequency (RF) switch unit, a positive voltage rectification unit, a negative voltage rectification unit and an alternating current (AC) synthesis unit;

an output port of the receiving antenna unit is connected to a common input port of the RF switch unit; a first microwave output end of the RF switch unit and a second microwave output end of the RF switch unit are correspondingly connected to a microwave input end of the positive voltage rectification unit and a microwave input end of the negative voltage rectification unit, respectively; a direct current (DC) output end of the positive voltage rectification unit and a DC output end of the negative voltage rectification unit are correspondingly connected to a positive voltage input port of the AC synthesis unit and a negative voltage input port of the AC synthesis unit, respectively; an AC output port of the AC synthesis unit is connected to an AC load;

the receiving antenna unit is configured for receiving microwave energy of a 2.4G microwave wireless transmission transmitter and transmitting the microwave energy to the RF switch unit;

the RF switch unit is configured for transmitting the microwave energy to the positive voltage rectification unit or the negative voltage rectification unit through a control signal;

the positive voltage rectification unit and the negative voltage rectification unit are configured for rectifying the microwave energy into positive DC and negative DC;

the AC synthesis unit is configured for combining the positive DC output by the positive voltage rectifying unit and the negative DC output by the negative voltage rectifying unit to generate square-wave AC, supplying power for the AC load.

2. The wireless single-phase AC-to-AC conversion circuit based on the 2.4G microwave according to claim 1, wherein the receiving antenna unit comprises a circularly polarized microstrip antenna.

3. The wireless single-phase AC-to-AC conversion circuit based on the 2.4G microwave according to claim 1, wherein the RF switch unit comprises a solid-state RF switch chip, a first capacitor, a second capacitor, a third capacitor, a first grounded capacitor, a second grounded capacitor, a third grounded capacitor and a fourth grounded capacitor;

a first pin of the solid-state RF switch chip is connected to the first grounded capacitor, the fourth grounded capacitor, and a reference potential point, respectively; a second pin of the solid-state RF switch chip is connected to the second grounded capacitor and a control signal end $V_{CTL}$, respectively; a third pin of the solid-state RF switch chip is connected to a first end of the first capacitor, and a second end of the first capacitor is connected to the 2.4G microwave wireless transmission transmitter; a fifth pin of the solid-state RF switch chip is connected to the third grounded capacitor and an enable end of the control signal, respectively; a ninth pin of the solid-state RF switch chip is connected to a first end of the second capacitor; a second end of the second capacitor is configured as a first microwave output port of the RF switch unit; a tenth pin of the solid-state RF switch chip and an eleventh pin of the solid-state RF switch chip are grounded; a twelfth pin of the solid-state RF switch chip is connected to a first end of the third capacitor; a second end of the third capacitor is configured as a second microwave output port of the RF switch unit.

4. The wireless single-phase AC-to-AC conversion circuit based on the 2.4G microwave according to claim 3, wherein the positive voltage rectification unit comprises a first resistor, a second resistor, a first grounded resistor, a first rectifier diode and a fifth grounded capacitor;

a first end of the first resistor is connected to the first microwave output port of the RF switch unit; a second end of the first resistor is connected to a first end of the second resistor and the first grounded resistor respectively; a second end of the second resistor is connected to a positive electrode of the first rectifier diode; a negative electrode of the first rectifier diode is connected to the fifth grounded capacitor, and a connection point where the negative electrode of the first rectifier diode is connected to the fifth grounded capacitor is configured as the DC output end of the positive voltage rectification unit.

5. The wireless single-phase AC-to-AC conversion circuit based on the 2.4G microwave according to claim 3, wherein the negative voltage rectification unit comprises a third resistor, a fourth resistor, a second grounded resistor, a second rectifier diode, and a sixth grounded capacitor;

a first end of the third resistor is connected to the second microwave output port RF2 of the RF switch unit; a second end of the third resistor is connected to a first end of the fourth resistor and the second grounded resistor, respectively; a second end of the fourth resistor is connected to a negative electrode of the second rectifier diode; a positive electrode of the second rectifier diode is connected to the sixth grounded capacitor, and a connection point where the positive electrode of the second rectifier diode is connected to the sixth grounded capacitor is configured as the DC output end of the negative voltage rectification unit.

6. The wireless single-phase AC-to-AC conversion circuit based on the 2.4G microwave according to claim 1, wherein the AC synthesis unit comprises a first MOS transistor, a second MOS transistor, a first port and a second port;

a first pin of the first port is connected to a source electrode of the first MOS transistor and the DC output end of the positive voltage rectification unit, respectively; a third pin of the first port is connected to a source electrode of the second MOS transistor and the DC output end of the negative voltage rectification unit, respectively; a first pin of the second port is connected to a drain electrode of the first MOS transistor and a drain electrode of the second MOS transistor, respectively, and a connection point where the first pin of the second port is connected to the drain electrode of the first MOS transistor and the drain electrode of the second MOS transistor is configured as the AC output port of the AC synthesis unit; a second pin of the first port, a gate electrode of the first MOS transistor, a gate electrode of the second MOS transistor, and a second pin of the second port are all grounded.

* * * * *